(12) United States Patent
Van Der Stok et al.

(10) Patent No.: US 8,345,740 B2
(45) Date of Patent: Jan. 1, 2013

(54) SYSTEM, TRANSMITTER, RECEIVER, METHOD AND SOFTWARE FOR TRANSMITTING AND RECEIVING ORDERED SETS OF VIDEO FRAMES

(75) Inventors: Petrus Desiderius Victor Van Der Stok, Eindhoven (NL); Elisabeth Francisca Maria Steffens, Eindhoven (NL); Sergei Kozlov, Eindhoven (NL); Ewout Brandsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1251 days.

(21) Appl. No.: 11/814,081

(22) PCT Filed: Jan. 12, 2006

(86) PCT No.: PCT/IB2006/050106
§ 371 (c)(1),
(2), (4) Date: Jul. 17, 2007

(87) PCT Pub. No.: WO2006/075302
PCT Pub. Date: Jul. 20, 2006

(65) Prior Publication Data
US 2008/0137728 A1    Jun. 12, 2008

(30) Foreign Application Priority Data
Jan. 17, 2005  (EP) .................................. 05100235

(51) Int. Cl.
*H04B 1/66* (2006.01)

(52) U.S. Cl. ..................................................... 375/240
(58) Field of Classification Search ........................ None
See application file for complete search history.

(56) References Cited

U.S. PATENT DOCUMENTS

| 5,974,224 | A | 10/1999 | Nagata |
| 6,353,700 | B1 | 3/2002 | Zhou |
| 6,711,122 | B1 * | 3/2004 | Langley et al. ............... 370/205 |
| 7,411,903 | B2 * | 8/2008 | Jang et al. .................... 370/230 |

FOREIGN PATENT DOCUMENTS

| EP | 1361690 A2 | 11/2003 |
| JP | 2001224032 A | 8/2001 |

OTHER PUBLICATIONS

Z. Zhang et al; "Efficient Selective Frame Discard Algorithms for Stored Video Delivery Across Resources Constrained Networks", Real-Time-Imaging-7, Academic Press Limited, vol. 7, No. 3. 2001 pp. 255-273, XP004419465.

(Continued)

Primary Examiner — Edan Orgad
Assistant Examiner — Brian Olion (57) ABSTRACT

When distributing a set 101 of frames 102 each with encoded data 103 from a transmitter 104 to a receiver 105, a dependent frame 108 requires an independent frame 107 for decoding, and the transmitting 111 of the frames 102 from a buffer 110 at the transmitter 104 is reordered such that the dependent frame 108 is sent after the independent frame 107. In particular, a transmission policy wherein buffering 109 a further frame 125 takes into account both: if the further frame 125 requires zero, one or two frames 102 of the set 101 for decoding, and the current frames 102 buffered at the first and the second position 123 of the transmit buffer 110.

14 Claims, 5 Drawing Sheets

OTHER PUBLICATIONS

S. K. Hang et al; "Packet Scheduling Algorithms for Wireless Video Streaming", HTTP://www-video.eecs.berkeley.edu/papers/sangk7/pv2002.pdf, 2004.

Injong Rhee; "Retransmission-Based Error Control for Interactive Video Applications Over the Internet", IEEE International Conference, pp. 118-127, 1998, XP010291577.

K. Chebrolu et al; "Selective Frame Discard for Interactive Video", 2004 IEEE International Conference, Paris, pp. 4097-4102, XP010711930.

P. Van Der Stok et al; "TCP-FCW Real-Time A/V Transport Protocol for Networks With Losses and Varying Bandwith", Einhoven University of Technology.

S. Liang et al; "TCP-RTM: Using TCP for Real Time", http://www-dsg.stanford.edu/sliang/rtm.pdf, 2004.

Y Lu et al; "Using Selective Discard to Improve Real-Time Video Quality on an Ethernet Local Area Network", International Journal of Network Management, vol. 9, pp. 106-117, 1999.

* cited by examiner

SYSTEM, TRANSMITTER, RECEIVER, METHOD AND SOFTWARE FOR TRANSMITTING AND RECEIVING ORDERED SETS OF VIDEO FRAMES

The invention relates to a method for distributing an ordered set of frames each with encoded data from a transmitter to a receiver, the set comprising an independent frame and a dependent frame, the dependent frame requiring the independent frame for decoding the data encoded in the dependent frame, the method comprising:

buffering the independent frame and the dependent frame in a buffer at the transmitter before transmittal, transmitting frames from the buffer at the transmitter to the receiver;

receiving, at the receiver, at least some of the frames transmitted.

The invention also relates to a method for transmitting, a method for receiving and presenting, a system, a transmitter, a receiver and computer program products for use in such a system, transmitter, or receiver.

Methods for distributing a set of frames each with encoded data from a transmitter to a receiver are well-known. If the frames are distributed using an unreliable network, e.g. a packet-based network like the Internet, the quality of the received frames suffers from network losses.

The patent application EP 1 361 690 A2 discloses a method wherein it is decided at the receiver and based on channel conditions, if a request for retransmitting the frame should be sent to the transmitter.

It is a drawback of this known method that it is less suited for use with a wireless network, such as a "WiFi" network in accordance with IEEE802.11, because in a wireless network the channel conditions vary over time quickly, such that monitoring the channel conditions is lagging too much to make a sensible decision. This results in a relatively low quality of the distributed frames, and, in the case that the frames are part of an MPEG stream, artifacts when rendering the MPEG stream.

It is an object of the invention to provide a method of the kind described in the opening paragraph that is more suited for use over a wireless network.

The object is realized in the method comprising reordering the transmitting of the frames from the buffer at the transmitter such that the dependent frame is sent after the independent frame; and presenting the frames received at an output of the receiver, such that the frames received are presented at the output in the order of the ordered set. By reordering the transmitting of the frames from the buffer, the chances are reduced that a frame is received that cannot be decoded due to a missing frame upon which the decoding depends. The bandwidth available for transmission of the frames is thus spent on frames that may actually be decoded. Another advantage is that the receiver may require less memory to buffer the data of the frames to be decoded. Also, the time lapsed between providing the frames at the transmitter and decoding the data of the frames received at the receiver may be smaller, due to the reordering.

In another embodiment, the system has the features of claim 2. The reordering of the frames may also take into account multiple dependencies between frames, such as the further dependent frame requiring the independent frame and the dependent frame for decoding the data encoded in the further dependent frame. This measure extends the advantages achieved with the measures of claim 1 also to frames with multiple dependencies.

In another embodiment, the system has the features of claim 3. Acknowledging the frames and transmitting the dependent frame after the independent frame is acknowledged, further reduces the risk that a frame is received that cannot be decoded. It also prevents spending bandwidth on transmitting a frame that cannot be decoded. This method is especially beneficial if the propagation delay is relatively small, because the acknowledging takes relatively little time in that case. In case that an acknowledgement for a frame is lacking, the frame may be rejected, i.e. not sent at all, or retransmitted. Frames that require the rejected frame for decoding may be rejected as well.

In another embodiment, the system has the features of claim 4. Retransmitting a frame may ensure that the frame is eventually acknowledged. This method is also especially beneficial if the propagation delay is relatively small, because the retransmitting takes relatively little time in that case.

In another embodiment, the system has the features of claim 5. This has the advantage that a buffer with two positions may be relatively small. This is relevant because buffering a single frame may require a considerable amount of memory already. Distinguishing between further frames that require zero, one or two frames of the set for decoding the data helps in further reducing the change that bandwidth is spent on frames that cannot be decoded. This particular transmitting policy appears to be surprisingly good in preventing artifacts when transmitting a stream of MPEG encoded frames over a packet based wireless network that uses a reactive mechanism like TCP or RTP/RTCP. On the other hand, the measure of this embodiment may be beneficial for preventive control mechanisms like UDP as well.

In another embodiment, the system has the features of claim 6. In many prior art methods, a frame is not transmitted if it is past the deadline. At first sight this even seems to make no sense, because bandwidth seems to be spoiled on transmitting a frame that will be anyhow too late. Still transmitting, receiving, processing, decoding, outputting or rendering the frame past the deadline however, effectively allows for a temporal distortion, and may prevent annoying artifacts.

In another embodiment, the system has the features of claim 7. Favoring a frame that offers a regular sub-sampling has the advantage of causing less motion judder.

In another embodiment, the system has the features of claim 8. If the dependencies of frames in a sequence of frames are the same, a good criterion for buffering is attempting to minimize the temporal distortion, e.g. from jitter caused by dropped frames.

The above object and features of the method 100 of the present invention will be more apparent from the following description with reference to the drawings.

As is known in the art, video may be encoded according to an MPEG standard, e.g. MPEG1, MPEG2, MPEG4. Such a standard distinguishes I-, P- and B-frames 102. The decoding of B-frames 102 depends on I-frames 102 and on P-frames 102. The decoding of P-frames 102 depends on previous P-frames 102 and (indirectly) on the immediately preceding I-frame. The decoding of I frames 102 proceeds without dependencies on other frames 102. An I-frame may thus be considered an independent frame 107, a P-frame may be considered a dependent frame 108, and a B-frame may be considered a dependent frame 108 or a further dependent frame 116.

It generally occurs frequently that a frame gets lost when transmitting 111 over a wireless medium. Unwanted artifacts may then appear, because the decoding of the consecutive B and P frames 102 relies on the contents from an earlier I-frame. If an I-frame is lost, the depending B and P frames 102 may rely on the contents from an earlier I-frame. The content of the I-frame transmitted before the lost one may be dramatically different from the contents of the lost I-frame. The purpose here is to prevent ensuing artifacts, which are perceived as very disturbing by the users viewing the transmitted video. According to the invention, the amount of transmitted video data 103 is automatically adapted to the available transmission capacity of the medium.

The system 200 according to the invention prevents artifacts substantially or even prevents them completely while maintaining only a small delay between frame generation, sending, reception and display. The proposed system 200 differs from other proposals, e.g. in the sense that frames 102 are decoded and displayed even when they are past their specified display time.

Figure 1:
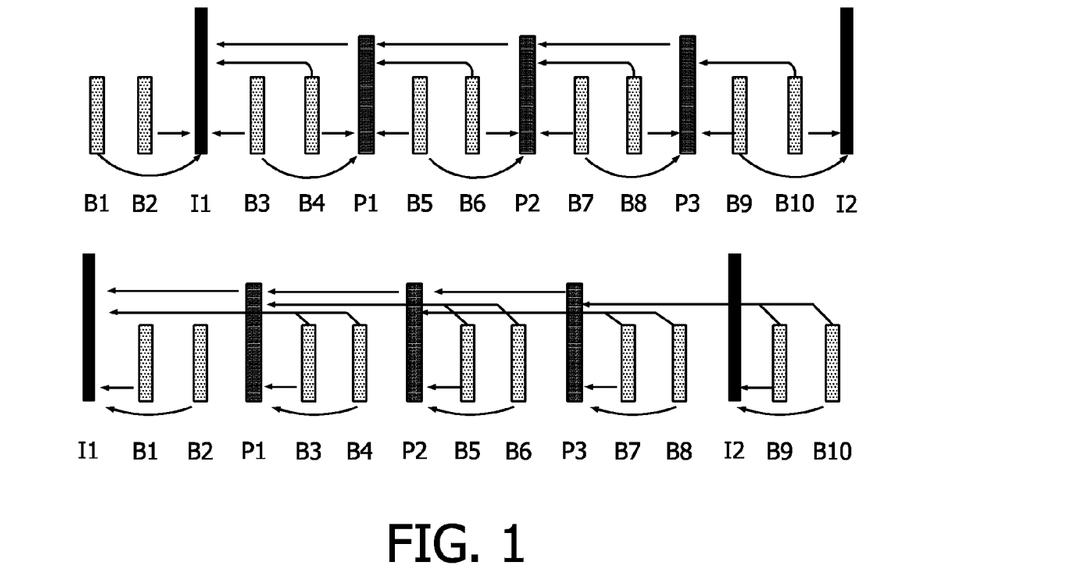
FIG. 1 shows an example of the visualization order and the transmission order of frames 102 of a particular GOP.

In FIG. 1 the structure of a typical Group of Pictures (GOP) is shown. In this particular example the GOP exists of one I frame followed by three P-frames 102. Between each two P-frames 102 and between consecutive I- and P-frames 102, there are two B-frames 102. The arrows indicate the dependencies between the frames 102. The arrow from B3 (B4) to P1 means that B3 (B4) needs data 103 from P1 to represent a complete Figure. Although B3 (B4) is displayed before the contents of P1, the frame P1 needs to be received and decoded before frame B3 (B4) can be decoded and displayed. Therefore, P1 is sent before B3 (B4) to the decoder and over the communication link. The transmission and decoding order is shown in the lower half of FIG. 1.

When losses occur on an e.g. wireless link, this may lead to packet loss and to frame loss, but it may also lead to a reduced available bandwidth. For example, the available bandwidth is reduced when retransmission of packets at the MAC layer of the wireless medium occurs. A reduced available bandwidth means that less frames 102 per second can be transmitted over the link. In the method 100 in accordance with the invention, under reduced available bandwidth circumstances, first B-frames 102 are rejected, then P frames 102, and even I-frames 102, in such an order that artifacts either do not occur or are severely reduced, depending on the buffer 110 size of the sending transmitter 104. Removing B-frames 102 already accommodates for bandwidth fluctuations of 50% for the example GOP.

Suppose, for example, that I1, B1 and B2 have been transmitted correctly and a sudden decrease in available bandwidth occurs.

According to the invention, the transmission of frame P1 is started, but when frames 102 B3 and B4 need to be transmitted, the transmission of frame P1 is continued instead. Frame P2 is transmitted after the complete transmission of P1, followed by the transmission of P3 at the expense of the frames 102 B5, B6, B7 and B8. In the upper part of FIG. 2 it is shown how only I1, P1, P2, P3 and I2 are transmitted and displayed.

Figure 2:
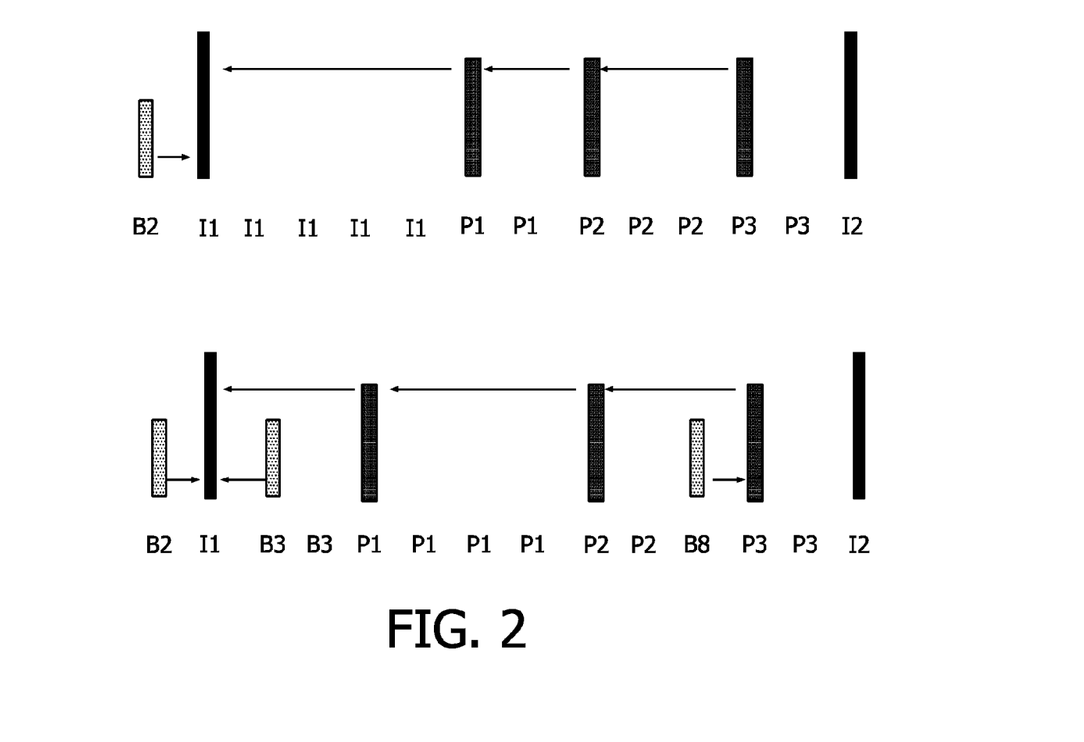
FIG. 2 shows examples of the loss of some or all B-frames 102.

In this particular example, the result is that the display of frame I1 is repeated 5 times, and consecutively P1 is displayed with a delay of 2 frames 102. The display of P1 is repeated until the arrival of P2, which is displayed with a delay of 1 frame. Finally, P3 arrives and is displayed with a delay of 1 frame, after which normal bandwidth conditions are restored and I2 is displayed in time.

In the lower part of FIG. 2 an alternative scenario is shown, in which some B frames 102 were transmitted under still normal bandwidth conditions. After the transmission of B1, B2, I1, P1 and B3, the wireless link degrades, such that no time is left to transmit B4. P2 is sent after transmission of B3, then transmission conditions improve and both P3 and B8 are transmitted in time, but no time is left for B7. In this scenario, the behavior of the system 200 according to the invention leads only to losing B-frame, and no artifacts are caused, because all received frames 102 have access to all data 103 needed for decoding. In this scenario, and assuming 25 frames/sec, the picture may be rendered such that it only stagnates for a maximum of 200 ms, which is far preferable above the artifacts as rendered with the known system 200.

In the system 200 according to the invention, and contrary to known transmission techniques, P-frames 102 are still transmitted although they are too late to be displayed at their original display time. In the example of FIG. 2, the P1 frame is displayed at the $7^{th}$ time slot although it should originally have been displayed at the $5^{th}$ time slot. In other transmission protocols frame P1 would be rejected, rather than being sent late.

Figure 3:
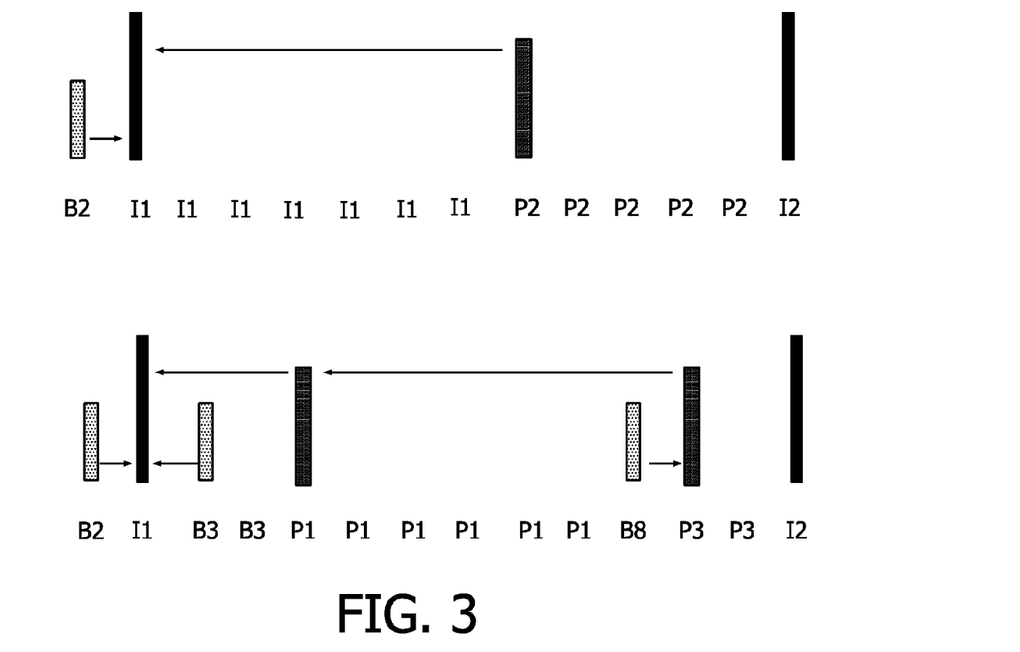
FIG. 3 shows examples of the loss of some or all B-frames 102 and P-frames 102.

In FIG. 3 it is shown that under further degrading bandwidth conditions, even sending P-frames 102 may be omitted. Not sending P-frames 102 may cater for bandwidth fluctuations that are larger than 50%. In the upper part of FIG. 3, even P1 is lost due to a further degrading bandwidth condition and the system 200 only transmitted P2. In this case there is a finite probability that an artifact is rendered, e.g. when the lost P1 frame introduces many other motion vector information with respect to I1. The image contained in I1 is displayed during 280 ms, assuming 25 frames/sec.

In the lower part of FIG. 3, the bandwidth conditions were different, and frame P2 was lost. In this case, artifacts may be generated if motion vectors were redefined in frame P2, affecting frame P3 that depends on them. As a result, the image in frame P1 may be on display during 240 ms, again assuming 25 frames/sec.

Instead of losing P2 between P1 and P3, or losing P1 between I1 and P2, it is generally better to loose first P3, then P2 and as last P1. Preferably, B frames 102 dependent on the lost P frames 102 are not rendered. To achieve this, the receiver 105 may be arranged for suppressing presenting 115 a B frame that depends on a lost P frame at its output 215.

Figure 4:
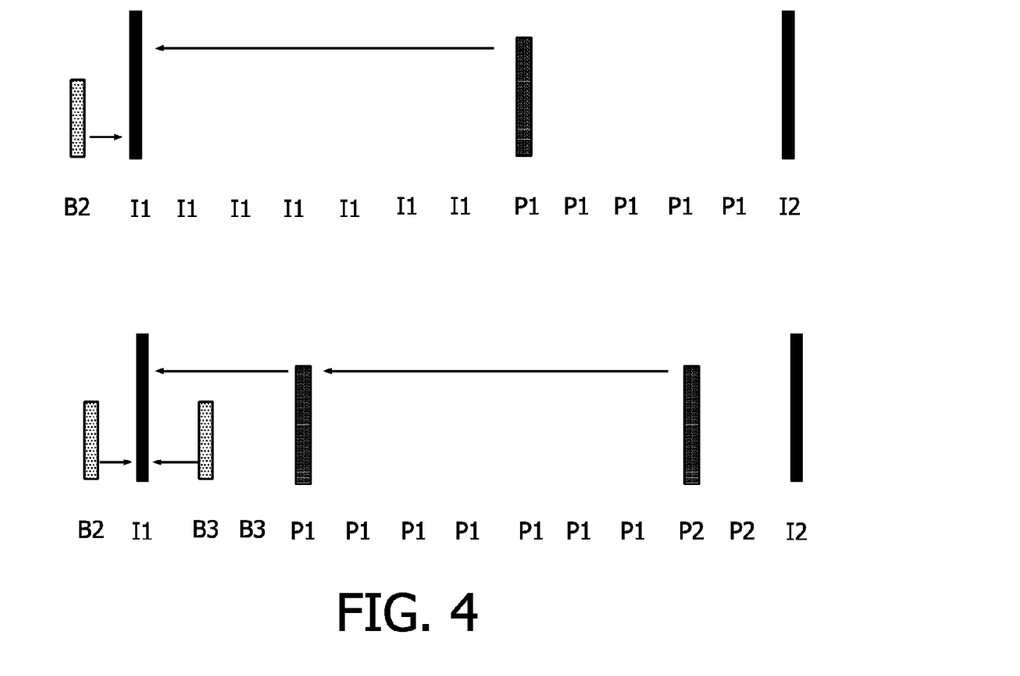
FIG. 4 shows examples of the loss of a P-frame.

In FIG. 4 this improved behavior is shown. Any artifact is prevented with the system 200 according to the invention in the scenario of FIG. 4. Frames B2 and B3 depend on I1, which is present. Frame P1 only depends on the transmitted I1 frame in the upper part of FIG. 4. In the lower part, frame P2 needs frame P1 that needs frame I1. All the required frames 102 are transmitted and no artifacts are created.

Under even worse bandwidth conditions complete GOPs may get lost. For instance, imagine that with respect of the lower part of FIG. 3, transmission completely stops after the transmission of frame P1, such that all consecutive frames 102 are lost. The next frame will be an I-frame of GOP n, for example n=19 represented by I19. This I19 will be displayed at a moment lying between the display time of I19 and I20. Behavior after I20 is then similar as shown in all former examples.

A scene change may coincide with an I-frame. Some encoders create an I-frame when a scene change takes place.

Not all encoders do this. For example a scene change may occur at frame B3. B3 will then contain a complete picture and so will the consecutive B4 and P2. Losing B3 and B4 will not affect the other images. However, the frame P2 containing the new scene acts as an I-frame and needs to be displayed because all consecutive frames 102 until I2 depend on it. The P frames 102 containing a new scene or scene change may be treated as an I-frame by the system 200. The encoder may signal such a P-frame, or it may be detected by the transmitter 104, for example by determining if the size of the P frame exceeds a threshold, or by determining if the number of motion vectors with respect to the former I-frame exceeds a threshold, or in general by determining if a function of properties of the frames 102 exceeds a threshold. Such signaling or detecting that a P-frame acts like an I-frame and subsequent treatment as an I-frame, has the advantage that artifacts may be prevented that otherwise might have been caused by dropping such a P-frame.

The transmission policy may for example be realized:
1. in the transmitter 104, e.g. at the link level of a wireless link that couples the transmitter 104 and the receiver 105 for a single hop wireless connection. According to the wireless standard, the receiver 105 returns an acknowledgement, which enables the transmitter 104 to determine that a frame is completely received by the receiver 105, if all the packets that carry the frame are acknowledged.
2. in the source, at the transport level of the Transport Control Protocol (TCP) of IETF. The TCP returns acknowledgements from destinations to the source such that the source knows whether a frame has been completely received by the receiver 105.

In both cases, the desired behavior may be implemented with a send buffer 110 for containing the frame that is currently sent, and a wait buffer 110 for containing the next frame to be sent. Only one frame fits in the send buffer 110 and only one frame fits in the wait buffer 110.

The send buffer 110 contains all packets belonging to the frame currently being transmitted. The wait buffer 110 contains all packets that belong to the frame that is intended for transmission immediately after the transmission of the frame in the send buffer 110. This solution assures that a relatively low amount of total memory is needed to buffer 110 the video frames 102.

When a frame has been sent from the send buffer 110 and reception of the frame has been acknowledged, and the wait buffer 110 holds a frame, then the frame is removed from the wait buffer 110 and inserted into the send buffer 110. This transfer can alternatively be achieved by exchanging the values in a pointer representing the wait buffer 110 and in a pointer representing the send buffer 110.

Under normal transmission conditions when the available bandwidth is high enough to transmit all offered frames 102, the wait buffer 110 is empty if the send buffer 110 is empty.

When, on the other hand, the available bandwidth is not high enough to transmit all offered frames 102, the algorithm in accordance with the invention assures that frames 102 are removed in a preferred order, as explained above. It is assumed that new frames 102 are offered with a frequency dictated by an encoder, e.g. 25 frames/second. Under a normal bandwidth condition, the sending buffer 110 and the waiting buffer 110 are both empty each time a new frame is made available for transmission, because the frames 102 are sent faster than they are generated. Under reduced bandwidth conditions frames 102 are removed according to the described algorithm.

The algorithm is described below, using the following notation:

x stands for frame of type x, with x is I, P or B. I may denote a standard I-frame, but it may alternatively denote a standard I-frame or a P-frame with a scene change as explained above.

W( ) and S( ) denote an empty wait buffer 110, and an empty send buffer 110

W(x) denotes that the wait buffer 110 contains frame x

S(x) denotes that the send buffer 110 contains frame x

When a frame has been sent and reception of the frame has been acknowledged, the buffer 110 is cleared. If after clearing S a frame waits in W, then the frame is removed from W and inserted into S.

Figure 5:
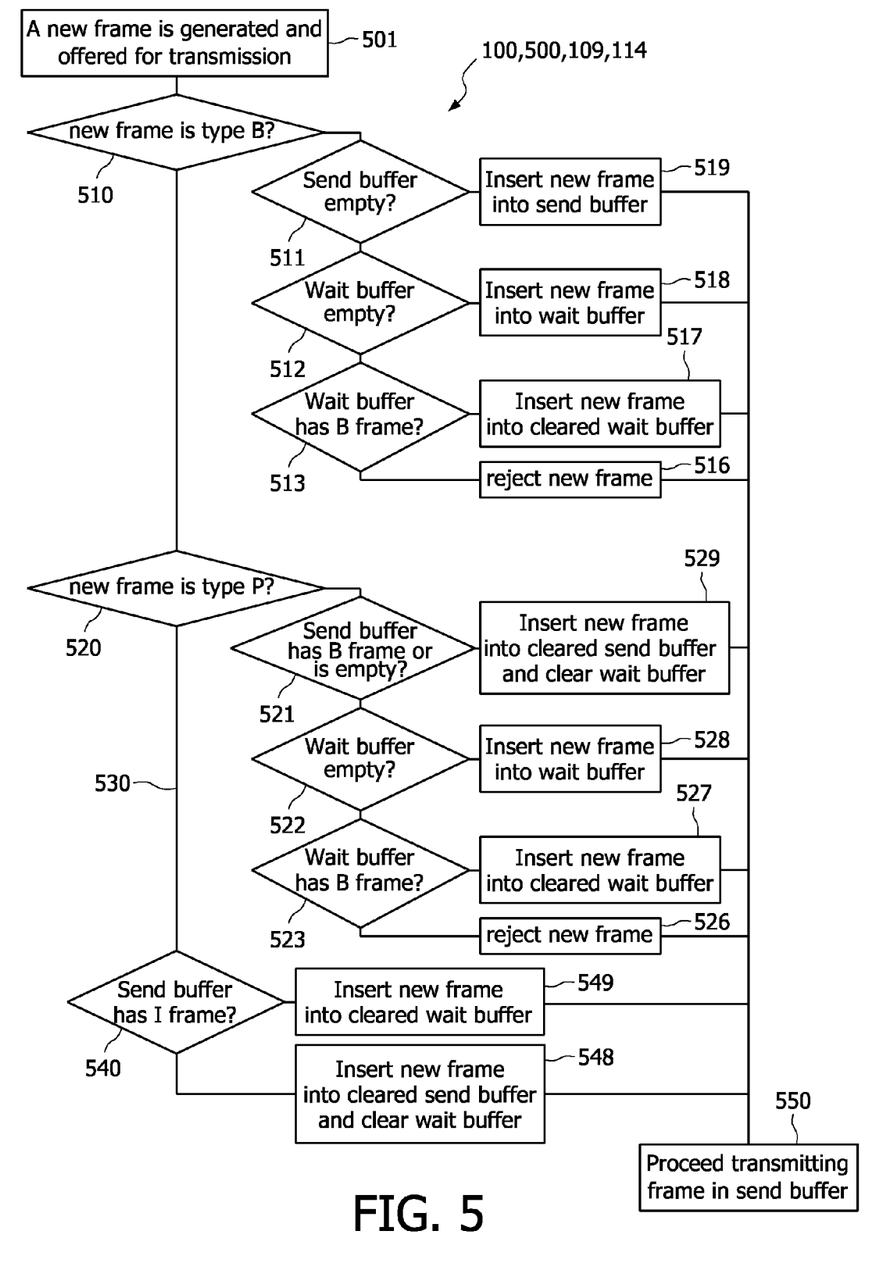
FIG. 5 shows a flow chart of a method 100 in accordance with the invention.

| | |
|---|---|
| Algorithm 1 | 500 |
| A new frame is generated and offered for transmission | 501 |
| When the new frame is of type B | 510 |
|     IF S( ), then insert frame into S | 511, |
|     ELSEIF W( ), then insert frame into W | 512, |
|     ELSEIF W(B), then clear W and insert frame into W | 513, |
|     ELSE reject new frame | 516 |
| When the new frame is of type P | 520 |
|     IF S( ), or S(B), then clear S, insert frame into S, and clear W | 521, 529 |
|     ELSEIF W( ), then insert frame into W | 522, 528 |
|     ELSEIF W(B), then clear W and insert frame into W | 523, |
|     ELSE reject new frame | 526 |
| When the new frame is of type I | 530 |
|     IF S(I), clear W, insert frame into W | 540, |
|     ELSE clear S, clear W, and insert frame into S | 548 |

The above algorithm implements the behavior as illustrated in FIG. 2 and FIG. 3. An embodiment is shown in FIG. 5 as a flow chart and the numbers in the right column above map to the items in the flow chart of FIG. 5.

In another example implementation, a Boolean "P-frame-lost" is introduced to assure that once a P-frame is lost, no more B-frames 102 and P-frames 102 are sent. When the new frame is of type P and is rejected, then the Boolean P-frame-lost is set 101 to True. When the new frame is of type B or of type P and P-frame-lost is true, the new frame is rejected. When the new frame is of type I, P-frame-lost is set 101 to False.

When more memory is available, the waiting buffer 110 may contain more than one frame, and buffers are inserted and removed from W according to the FIFO discipline. The algorithm may then be changed to become:
Algorithm 2
A new frame is generated and offered for transmission
When the new frame is of type B
   IF S( ), then insert frame into S
   ELSEIF W( ), then insert frame into W
   ELSEIF W(B), then clear W and insert frame into W
   ELSE reject new frame
When the new frame is of type P
   IF S( ), or S(B), then clear S, insert frame into S, and clear W
   ELSEIF W( ), then insert frame into W
   ELSEIF W(B), then clear W, insert frame into W
   ELSEIF W (at least one P), add frame to W
When the new frame is of type I
   IF S(I), clear W, insert frame into W
   ELSE clear S, clear W, and insert frame into S The above algorithms enable very reactive (temporal) scalability for streaming over (wireless) networks, by giving I frames 102 a higher priority than P and B frames 102 and P frames 102 a higher priority than B frames 102. In case of network interface backpressure, lower priority frames 102 are dropped in favor of higher priority frames 102. This leads to a temporal sub-sampling of the stream, but without annoying blocking artifacts. This means that in case of a limited bandwidth, the refresh rate (i.e. the actual frame rate) is reduced, but no blocking artifacts occur, amounting to temporal scalability. These measures have the additional advantage that the transmit decision may be delayed until packet scheduling occurs, offering a very fast feedback loop.

A further enhancement of the above algorithms introduces further prioritization among B-frames 102. In this enhanced embodiment, and when sufficient bandwidth is available to send all I and all P frames 102, but only a subset 101 of the B-frames 102, the (higher priority) B-frames 102 that offer a regular sub-sampling of the original video content are favored over those that do not offer a regular sub-sampling. In an example with a GOP structure with M=4, the 'middle' B frames 102 get higher priority than the 'left' and the 'right' ones. Dropping the 'left' and the 'right' ones, but not the 'middle' ones leads to a constant frame rate that is half of the original stream and hence leads to minimal motion judder given the circumstances.

Although the MPEG standard permits otherwise, most streams have a regular GOP structure, which does not change very often. The GOP structure is regular in the sense that all anchor frames 102 in a GOP have the same distance M and all GOPs have the same structure (N, M). For example:
IBPBPBPBPBPBPBPB N=16, M=2
IBBPBBPBBBPBBPBB N=15, M=3
IBBBPBBBPBBBPBBB N=16, M=4

This structure enables a regular sub-sampling of the stream. For example in case of a 25 Hz original stream with N=15, M=3, dropping all B-frames 102 leads to a regular refresh rate of 8.33 Hz and dropping all P and B frames 102 to a regular (albeit low) refresh rate of 1.667 Hz.

To maintain a regular frame rate, i.e. a relatively low motion judder, in the last example (N=16, M=4) when bandwidth is such that only part of all B-frames 102 need to be dropped, the 'middle' B-frames 102 should be favored over the 'left' and 'right' ones. For example in the sequence: $I_1B_2B_3B_4P_5B_6B_7B_8P_9B_{10}B_{11}B_{12}P_{13}B_{14}B_{15}B_{16}I_{17}$, dropping $B_2$, $B_6$, $B_{10}$, $B_{14}$ and $B_4$, $B_8$, $B_{12}$, $B_{16}$ while keeping $B_3$, $B_7$, $B_{11}$, $B_{15}$ leads to a nice regular sub-sampling with a refresh rate of 12.5 Hz. This can be accomplished by giving the 'middle' B-frames 102 a higher priority than 'left' and 'right' ones. This may have no impact on a packet scheduler but may require some modification to a packet tagger.

Figure 7:
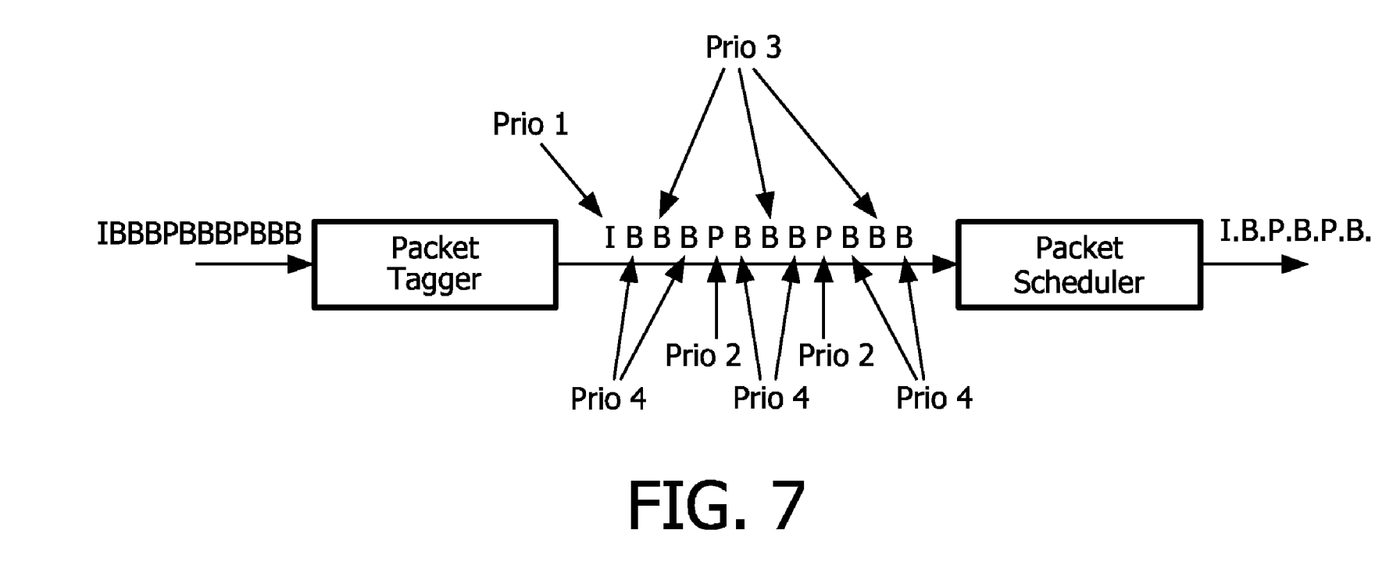
FIG. 7 shows an example of obtaining a regular sub-sampling.

FIG. 7 shows how frames 102 (or, more precisely, the packets (UDP or TCP) containing parts of those frames 102) are assigned priorities (1=highest, 4=lowest) by the packet tagger. The packet scheduler uses these priorities to favor higher priority frames 102 over lower priority ones. In the example depicted in FIG. 7, all frames 102 having priority 4 are dropped as indicated with a period ".", but all frames 102 having priority 3 remain.

Similar arguments apply for GOP-structures with larger or smaller M, although the structure will not always be perfectly regular.

The measure of regular sub-sampling of B-frames 102 is generally applicable to temporal sub-sampling of main profile MPEG streams in the compressed domain. It is not limited to server side trans-coding based on network interface back-pressure. Another application would be a server side transcoder reacting on network throughput feedback from the client (e.g. RTCP-based). Yet another application is the frame-dropping scheme of an e.g. client side decoder, to cope with the late arrival of frames 102 as described in Lu and Christensen, "Using Selective Discard to Improve Real-Time Video Quality on Ethernet Local Area Network", Int. J. Network Mgmt. 9, -117 (1999). A further application is coping with limitations in the processing bandwidth of the decoder. The latter application may also be used for playback from local storage. This is e.g. apparent from a mapping between the terms of the claims to a system 200 performing a play back from a local storage. In one such a mapping, the transmitter 104 is mapped onto the local data 103 source, like the file system 200 or file server, and the receiver 105 is mapped onto the application with the data 103 sink, like the file handle or consuming stream end point. The frames 102 are in such a case distributed from the local storage like a disk or a solid-state memory to the consuming application.

Figure 6:
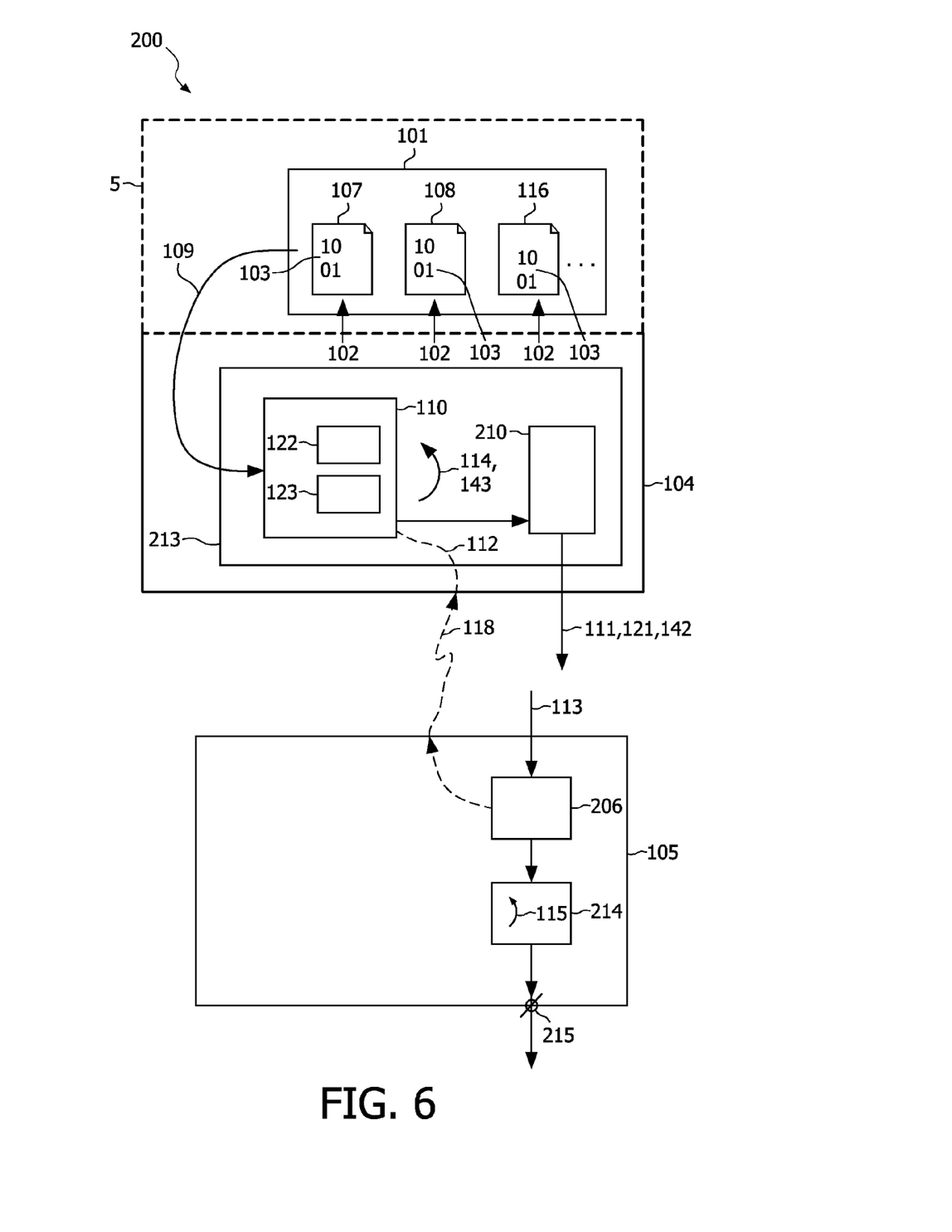
FIG. 6 shows a block diagram of a system 200 in accordance with the invention.

FIG. 6 shows a system 200 for distributing an ordered set 101 of frames 102 with encoded data 103. The system 200 may comprise a medium between the transmitter 104 and the receiver 105, like air, a bus, an Internet, an in-home network, and may be wired or wireless, e.g. a bus inside a PC or data 103 processing device, an Ethernet LAN, a WiFi link, a Blue-Tooth connection, a Zigbee hop, an ad-hoc wireless network. The set 101 is distributed in the system 200 from a transmitter 104 to a receiver 105. The set 101 comprises an independent frame 107 and a dependent frame 108. The dependent frame 108 requires the independent frame 107 for decoding the data 103 encoded in the dependent frame 108. The dependent frame 108 may be available to the transmitter 104 before the independent frame 107 is, such as typically occurs with frames 102 at the output 215 of an MPEG encoder.

The transmitter 104 has a buffer 110 for buffering 109 the independent frame 107 and the dependent frame 108 before transmittal. The buffer 110 may be just an allocated part of main memory of a general-purpose computer, but it may also be a dedicated cache. The transmitter 104 has a dispatcher 210 for dispatching frames 102 from the buffer 110 to the receiver 105. The dispatcher 210 may be arranged to dispatch each frame in one or more packets like IP packets. The transmitter 104 comprises reordering means 213 for reordering 114 the transmitting 111 of the frames 102. The reordering means 213 may be implemented in a software routine that exchanges the values in two pointer variables, but it may also be implemented in hardware that exchanges the content of two registers. The transmitter 104 is further arranged for reordering 114 the transmitting 111 of the frames 102 from the buffer 110 at the transmitter 104 such that the dependent frame 108 is sent after the independent frame 107. This may comprise analysis of the dependency structure of the frames 102 in the set 101. It may comprise detection of a P-frame being used as an I-frame.

The receiver 105 has receiving means 206 for receiving 113 at least some of the frames 102 transmitted. Because the distribution may be unreliable, not all frames 102 dispatched are in general received. The receiver 105 has an output 215 for presenting the frames 102 received. The output 215 may comprise a physical connector or pin, or a rendering device with a display screen, but it may also comprise a software object like a streaming end point, a data sink, a file handle, a port or a socket. The receiver 105 has reordering and presenting means 214 for reordering and presenting 115 the frames 102 received. The reordering and presenting means 214 may comprise a memory for buffering 109 the frames 102 received. The receiver 105 is further arranged for reordering 114 the frames 102 received. The reordering 114 is performed such that the frames 102 received are presented at the output 215 in the order of the ordered set 101. In the case of an MPEG stream, time stamps may be accessed to reorder the frames 102 properly. Many other ways may be applied to obtain the proper order of the frames 102.

It is noted that the above-mentioned embodiments illustrate rather than limit the invention, and that those skilled in the art will be able to design many alternative embodiments without departing from the scope of the appended claims. For example, for efficiency reasons, an alternative implementation may never clear buffer 110 S and will continue to transmit any frame for which the transmission was started. In the claims, any reference signs placed between parentheses shall not be construed as limiting the claim. Use of the word "comprise" and its conjugations does not exclude the presence of elements or steps other than those stated in a claim. Use of the indefinite article "a" or "an" preceding an element does not exclude the presence of a plurality of such elements. The invention can be implemented by means of hardware comprising several distinct elements, and by means of a suitably programmed computer. In a system 200 or a device claim that enumerates several means, several of these means can be embodied by the same item of hardware. The mere fact that certain measures are recited in mutually different dependent claims does not indicate that a combination of these measures cannot be used to advantage.

A 'computer program' is to be understood to mean any software product stored on a computer-readable medium, such as a floppy disk, downloadable via a network, such as the Internet, or marketable in any other manner.

The invention claimed is:

1. A method for distributing an ordered set of frames each with encoded data from a transmitter to a receiver, wherein the ordered set comprises at least an independent frame and a dependent frame, the dependent frame requiring the independent frame for decoding the data encoded in the dependent frame, the method comprising:

buffering frames of the ordered set of frames that include at least the independent frame or the dependent frame in a buffer at the transmitter before transmittal, wherein the buffer includes a send buffer and a wait buffer;

transmitting frames from the send buffer at the transmitter to the receiver;

reordering the transmitting of the frames from the send buffer at the transmitter (i) such that the dependent frame is sent after the independent frame and (ii) in response to an acknowledgement that a sent frame is completely received by the receiver, wherein responsive to the acknowledgement that the sent frame is completely received by the receiver, a frame held in the wait buffer is removed and inserted into the send buffer, further wherein the reordering the transmitting (a) reduces a risk that a frame is received by the receiver that cannot be decoded due to a missing frame upon which the decoding depends by sending the dependent frame after the independent frame in response to the acknowledgement that the independent frame has been completely received by the receiver, (b) prevents spending bandwidth of a transmission medium on transmitting a frame that cannot be decoded for a situation in which the independent frame has not been completely received by the receiver prior to transmitting the frame that that cannot be decoded as a result of the independent frame not being completely received by the receiver, further so that the bandwidth of the transmission medium is not used for transmitting the frame that cannot be decoded due to a missing frame upon which the decoding depends, and (c) automatically adapts an amount of transmitted frames to an available transmission capacity of the transmission medium, the available transmission capacity being subject to reduced available bandwidth circumstances;

receiving, at the receiver, at least some of the frames transmitted; and reordering and presenting the received frames at an output of the receiver such that the received frames are presented at the output in the order of the ordered set.

2. The method according to claim 1, wherein the ordered set further comprises a further dependent frame, the further dependent frame requiring the independent frame and the dependent frame for decoding the data encoded in the further dependent frame, wherein the reordering further comprises:

reordering the transmitting of the frames from the send buffer at the transmitter such that the further dependent frame is sent after the dependent frame.

3. The method according to claim 1, further comprising:

acknowledging the frames received by the receiver to the transmitter; and reordering the transmitting of the frames from the send buffer such that the dependent frame is sent after the independent frame being acknowledged.

4. The method according to claim 1, further comprising:

removing an acknowledged frame from the send buffer by replacing it with a frame from the wait buffer; and retransmitting a frame transmitted from the send buffer until it is acknowledged.

5. The method according to claim 1, wherein the buffering in the buffer further comprises the buffer having a first position as the send buffer and a second position as the wait buffer, and wherein the buffering still further comprises buffering a further frame of the ordered set for transmittal to the transmitter, and wherein buffering the further frame comprises:

(I)

if the further frame requires two frames of the ordered set for decoding the data encoded in the further frame:

if the first position is empty: insert the further frame in the first position;

else, if the second position is empty: insert the further frame in the second position;

else, if the second position holds a still further frame that requires two frames of the set for decoding the data encoded in the still further frame: clear the second position and insert the further frame in the second position;

else reject the further frame; and (II)

if the further frame requires one frame of the ordered set for decoding the data encoded in the further frame:

if the first position is empty, or if the first position holds a still further frame that requires two frames of the ordered set for decoding the data encoded in the still further frame: clear the first and the second position and insert the further frame in the first position;

else, if the second position is empty: insert the further frame in the second position;

else, if the second position holds a still further frame that requires two frames of the set for decoding the data encoded in the still further frame: clear the second position and insert the further frame in the second position;

else reject the further frame; and (III)

if the further frame requires zero frames of the ordered set for decoding the data encoded in the further frame:

if the first position holds a still further frame that requires zero frames of the set for decoding the data encoded in the still further frame: clear the second position and insert the further frame in the second position;

else, clear the first position and insert the further frame in the first position.

6. The method according to claim 1, further comprising:
provide a deadline for transmitting, receiving, processing, decoding, outputting or rendering a frame at the receiver; and
transmitting, receiving, processing, decoding, outputting or rendering the frame after the deadline.

7. The method according to claim 1, further comprising:
favoring, between frames having the same dependency, a frame that offers a regular sub-sampling in connection with the reordering the transmitting of the frames from the send buffer.

8. The method according to claim 1, further comprising:
buffering a 'middle' frame in a sequence of B frames in the send buffer of the transmitter such that the presenting of reordered frames at the output of the receiver has less jitter than a jitter resulting from buffering another frame of the sequence of B frames.

9. A system for distributing an ordered set of frames with encoded data, wherein the ordered set comprises at least an independent frame and a dependent frame, the dependent frame requiring the independent frame for decoding the data encoded in the dependent frame, the system comprising:
a transmitter for transmitting frames; and
a receiver for receiving at least some of the transmitted frames, (I)
wherein the transmitter comprises:
a buffer for buffering frames of the ordered set of frames that include at least the independent frame or the dependent frame before transmittal, wherein the buffer includes a send buffer and a wait buffer;
a dispatcher for transmitting frames from the send buffer to the receiver; and
a processor for reordering the transmitting of the frames from the send buffer (i) such that the dependent frame is sent after the independent frame and (ii) in response to an acknowledgement that a sent frame is completely received by the receiver, wherein responsive to the acknowledgement that the sent frame is completely received by the receiver, a frame held in the wait buffer is removed and inserted into the send buffer, further wherein the reordering the transmitting (a) reduces a risk that a frame is received by the receiver that cannot be decoded due to a missing frame upon which the decoding depends by sending the dependent frame after the independent frame in response to the acknowledgement that the independent frame has been completely received by the receiver, (b) prevents spending bandwidth of a transmission medium on transmitting a frame that cannot be decoded for a situation in which the independent frame has not been completely received by the receiver prior to transmitting the frame that cannot be decoded as a result of the independent frame not being completely received by the receiver, further so that the bandwidth of the transmission medium is not used for transmitting the frame that cannot be decoded due to a missing frame upon which the decoding depends, and (c) automatically adapts an amount of transmitted frames to an available transmission capacity of the transmission medium, the available transmission capacity being subject to reduced available bandwidth circumstances; and (II)
the receiver comprises:
a frame receiver for receiving at least some of the frames transmitted via the dispatcher;
a processor for reordering and presenting the received frames in the order of the ordered set at an output of the receiver.

10. A transmitter for distributing an ordered set of frames each with encoded data from the transmitter to a receiver, wherein the ordered set comprises at least an independent frame and a dependent frame, the dependent frame requiring the independent frame for decoding the data encoded in the dependent frame, the transmitter comprising:
a buffer for buffering frames of the ordered set of frames that include at least the independent frame or the dependent frame before transmittal, wherein the buffer includes a send buffer and a wait buffer;
a dispatcher for transmitting frames from the send buffer to the receiver; and
a processor for reordering the transmitting of the frames from the send buffer (i) such that the dependent frame is sent after the independent frame and (ii) in response to an acknowledgement that a sent frame is completely received by the receiver, wherein responsive to the acknowledgement that the sent frame is completely received by the receiver, a frame held in the wait buffer is removed and inserted into the send buffer, further wherein the reordering the transmitting (a) reduces a risk that a frame is received that cannot be decoded due to a missing frame upon which the decoding depends by sending the dependent frame after the independent frame in response to the acknowledgement that the independent frame has been completely received by the receiver, (b) prevents spending bandwidth of a transmission medium on transmitting a frame that cannot be decoded for a situation in which the independent frame has not been completely received by the receiver prior to transmitting the frame that cannot be decoded as a result of the independent frame not being completely received by the receiver, further so that the bandwidth of the transmission medium is not used for transmitting the frame that cannot be decoded due to a missing frame upon which the decoding depends, and (c) automatically adapts an amount of transmitted frames to an available transmission capacity of the transmission medium, the available transmission capacity being subject to reduced available bandwidth circumstances.

11. A receiver for use in connection with distributing an ordered set of frames each with encoded data from a transmitter to the receiver, wherein the ordered set comprises at least an independent frame and a dependent frame, the dependent frame requiring the independent frame for decoding the data encoded in the dependent frame, the receiver comprising:
a frame receiver for receiving at least some of the frames transmitted;
a processor for reordering and presenting the received frames in the order of the ordered set at an output of the receiver, wherein the received frames comprise frames transmitted from a send buffer of the transmitter via a reordering the transmitting of the frames from the send buffer (i) such that the dependent frame is sent after the independent frame and (ii) in response to an acknowledgement that a sent frame is completely received by the receiver, wherein responsive to the acknowledgement that the sent frame is completely received by the receiver, a frame held in a wait buffer is removed and inserted into the send buffer, further wherein the reordering the transmitting (a) reduces a risk that a frame is received that cannot be decoded due to a missing frame upon which the decoding depends by sending the dependent frame after the independent frame in response to the acknowledgement that the independent frame has been completely received by the receiver, (b) prevents spending bandwidth of a transmission medium on transmitting a frame that cannot be decoded for a situation in which the independent frame has not been completely received by the receiver prior to transmitting the frame that cannot be decoded as a result of the independent frame not being completely received by the receiver, further so that the bandwidth of the transmission medium is not used for transmitting the frame that cannot be decoded due to a missing frame upon which the decoding depends, and (c) automatically adapts an amount of transmitted frames to an available transmission capacity of the transmission medium, the available transmission capacity being subject to reduced available bandwidth circumstances.

12. A method for transmitting in connection with distributing an ordered set of frames each with encoded data from a transmitter to a receiver, wherein the ordered set comprises at least an independent frame and a dependent frame, the dependent frame requiring the independent frame for decoding the data encoded in the dependent frame, the method comprising:

buffering frames of the ordered set of frames that include at least the independent frame or the dependent frame in a buffer at the transmitter before transmittal, wherein the buffer includes a send buffer and a wait buffer;

transmitting frames from the send buffer at the transmitter to the receiver; and reordering the transmitting of the frames from the send buffer at the transmitter (i) such that the dependent frame is sent after the independent frame and (ii) in response to an acknowledgement that a sent frame is completely received by the receiver, wherein responsive to the acknowledgement that the sent frame is completely received by the receiver, a frame held in the wait buffer is removed and inserted into the send buffer, further wherein the reordering the transmitting (a) reduces a risk that a frame is received that cannot be decoded due to a missing frame upon which the decoding depends by sending the dependent frame after the independent frame in response to the acknowledgement that the independent frame has been completely received by the receiver, (b) prevents spending bandwidth of a transmission medium on transmitting a frame that cannot be decoded for a situation in which the independent frame has not been completely received by the receiver prior to transmitting the frame that cannot be decoded as a result of the independent frame not being completely received by the receiver, further so that the bandwidth of the transmission medium is not used for transmitting the frame that cannot be decoded due to a missing frame upon which the decoding depends, and (c) automatically adapts an amount of transmitted frames to an available transmission capacity of the transmission medium, the available transmission capacity being subject to reduced available bandwidth circumstances.

13. A method for receiving in connection with distributing an ordered set of frames each with encoded data from a transmitter to a receiver, wherein the ordered set comprises at least an independent frame and a dependent frame, the dependent frame requiring the independent frame for decoding the data encoded in the dependent frame, the method comprising:

receiving, at the receiver, at least some of the frames transmitted;

reordering and presenting the received frames at an output of the receiver, such that the frames received are presented at the output in the order of the ordered set, wherein the received frames comprise frames transmitted from a send buffer of the transmitter via a reordering the transmitting of the frames from the send buffer (i) such that the dependent frame is sent after the independent frame and (ii) in response to an acknowledgement that a sent frame is completely received by the receiver, wherein responsive to the acknowledgement that the sent frame is completely received by the receiver, a frame held in a wait buffer is removed and inserted into the send buffer, further wherein the reordering the transmitting (a) reduces a risk that a frame is received that cannot be decoded due to a missing frame upon which the decoding depends by sending the dependent frame after the independent frame in response to the acknowledgement that the independent frame has been completely received by the receiver, (b) prevents spending bandwidth of a transmission medium on transmitting a frame that cannot be decoded for a situation in which the independent frame has not been completely received by the receiver prior to transmitting the frame that cannot be decoded as a result of the independent frame not being completely received by the receiver, further so that the bandwidth of the transmission medium is not used for transmitting the frame that cannot be decoded due to a missing frame upon which the decoding depends, and (c) automatically adapts an amount of transmitted frames to an available transmission capacity of the transmission medium, the available transmission capacity being subject to reduced available bandwidth circumstances.

14. A non-transitory computer readable medium embodied with a computer program of instructions executable by a processor for distributing a set of frames with encoded data from a transmitter to a receiver, enabling the processor to execute the steps of the method according to claim 1.

* * * * *